United States Patent
Ernst

(10) Patent No.: US 6,312,185 B1
(45) Date of Patent: Nov. 6, 2001

(54) TENSION ROD ANCHOR HAVING A SEALING STRUCTURE

(75) Inventor: Peter Ernst, Mattersheim (DE)

(73) Assignee: DEHA Ankersysteme GmbH & Co. KG, Gross-Gerau (DE)

( * ) Notice: Subject to any disclaimer, the term of this patent is extended or adjusted under 35 U.S.C. 154(b) by 0 days.

(21) Appl. No.: 09/402,938
(22) PCT Filed: Mar. 25, 1998
(86) PCT No.: PCT/EP98/01739
  § 371 Date: Feb. 1, 2000
  § 102(e) Date: Feb. 1, 2000
(87) PCT Pub. No.: WO98/46890
  PCT Pub. Date: Oct. 22, 1998

(30) Foreign Application Priority Data

Apr. 14, 1997 (DE) .......................... 297 06 509 U

(51) Int. Cl.⁷ .................. F16B 37/00; F16B 7/06
(52) U.S. Cl. .................. 403/288; 403/343; 411/303
(58) Field of Search .............. 403/10, 288, 306, 403/296, 343, 157, 79; 285/354; 411/301, 302, 303, 304; 77/641

(56) References Cited

U.S. PATENT DOCUMENTS

| | | | |
|---|---|---|---|
| 3,040,796 | * 6/1962 | Gouverneur, II | 411/303 |
| 3,156,323 | * 11/1964 | Boyer, Sr. | 403/288 X |
| 3,390,900 | 7/1968 | McCormick et al. | |
| 3,915,478 | * 10/1975 | Al et al. | 403/288 X |
| 4,003,669 | * 1/1977 | Fenske et al. | 403/288 |
| 4,355,200 | * 10/1982 | Wheeler et al. | 174/140 S |
| 5,188,473 | 2/1993 | Danz . | |
| 5,221,113 | 6/1993 | Stoll . | |
| 5,961,160 | * 10/1998 | Frohlich | 285/354 X |
| 6,071,052 | * 6/2000 | Kerr | 411/302 |

FOREIGN PATENT DOCUMENTS 86 02 266   3/1986 (DE) .
2 130 020   11/1972 (FR) .

* cited by examiner

*Primary Examiner*—Harry C. Kim
(74) *Attorney, Agent, or Firm*—Burns, Doane, Swecker & Mathis, L.L.P.

(57) ABSTRACT

A rod anchor is threadedly connected to a tension rod. The rod anchor includes an anchor head having a threaded first bore hole formed therein, and a sealing nut attached to the anchor head in sealing relationship therewith. The sealing member forms a second bore hole axially aligned with the first bore hole, whereby a threaded end of the tension rod extends through the second bore hole and into threaded engagement with the first bore hole. The sealing nut includes sealing material forming a seal between the sealing nut and the tension rod.

23 Claims, 2 Drawing Sheets

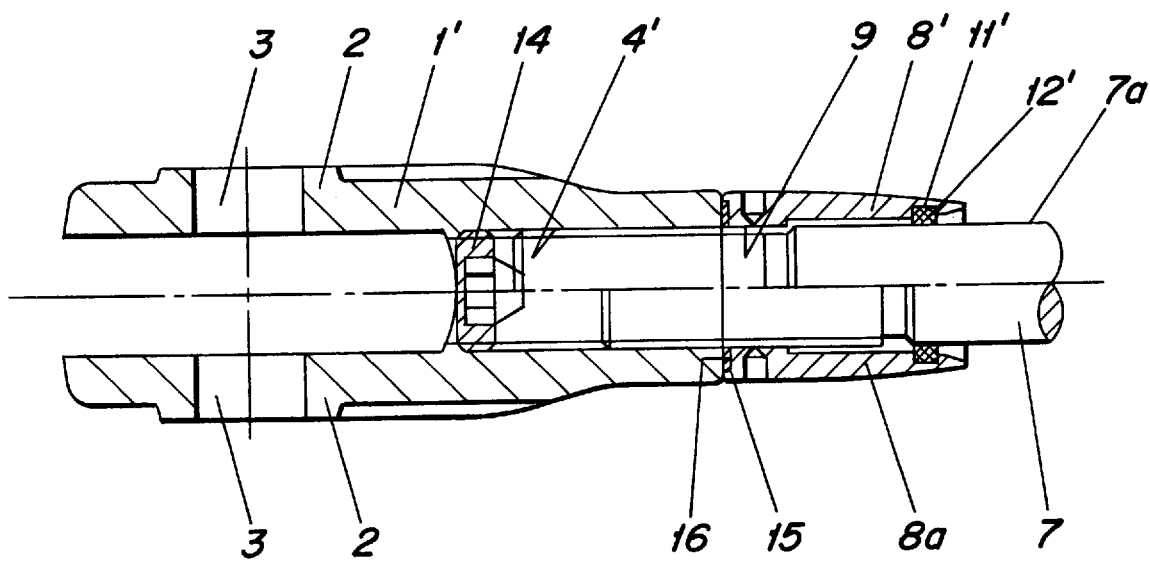

TENSION ROD ANCHOR HAVING A SEALING STRUCTURE

BACKGROUND OF THE INVENTION

The invention relates to a rod anchor for tension rods comprising an anchor head with a threaded bore hole into which the end of a tension rod with an outer thread can be screwed.

This type of rod anchors is known from EP 04 80 9571B1. Therein the anchor head has usually two parallel eye bars that have bore holes for the insertion of eye pins. In this context, coupling sleeves or spring-loaded couplings are also meant to be rod anchors, which serve to connect two rods having outer threads.

In practice it has been shown that corrosion may occur in the area of the thread connection between the tension rod and the anchor head. Therefore, it is the task of the invention to develop a rod anchor of the above-mentioned type in such a manner that corrosion is prevented in the area of the connection between the tension rod and the anchor head.

SUMMARY OF THE INVENTION

This task is solved according to the invention in that a sealing nut, which is placed against the front side of the anchor head, has an inner rod seal and this inner rod seal forms a seal around the smooth cylindrical outer surface of the tension rod while being screwed down, so that the sealing nut is completely sealed against the anchor head and whereby the threaded bore hole is tightly closed at its inner bore end.

In this way, complete sealing is achieved in the corrosion-susceptible area of the threaded connection between the tension rod and the anchor head. The insertion of a special sealing nut to form a seal around the tension rod has the effect that this especially critical and important sealing section in the area of the smooth cylindrical outer surface of the cylinder may be relocated and is therefore outside the outer thread of the tension rod since effective sealing in the threaded area itself in not possible.

An additional sealing measure in the area between the sealing nut and the anchor head or between the end of the threaded bore hole of the anchor head ensures that no moisture may penetrate into these areas so that the threaded connection between the tension rod and the anchor head is completely sealed on all sides. Thereby penetration of moisture and development of corrosion is made impossible.

According to a preferred version of the invention, the attachment of the sealing nut is accomplished in a simple manner whereby the sealing nut is a lock nut that is screwed with its inner nut thread to the outer thread of the tension rod and whereby the rod seal is located within a nut extension, which joins the inner nut thread.

The design of the sealing nut as a lock nut does not only serve as simple and effective attachment of the sealing nut but also ensures retention of the threaded connection between the tension rod and the anchor head.

According to another design of the innovative idea, the attachment of the sealing nut is accomplished in that it is screwed to the outer thread of the anchor head.

BRIEF DESCRIPTION OF THE INVENTION

Versions of the invention as illustrated in the drawings are described in more detail below:

FIG. 3 and FIG. 4 show a cross-sectional view similar to FIG. 2 of a respective modified versions of the rod anchor, whereby in FIG. 2 through FIG. 4 the tension rod is illustrated in the upper and lower half of the page as it is screwed down to various depths.

DETAILED DESCRIPTION OF THE PREFERRED EMBODIMENTS

Figure 1:
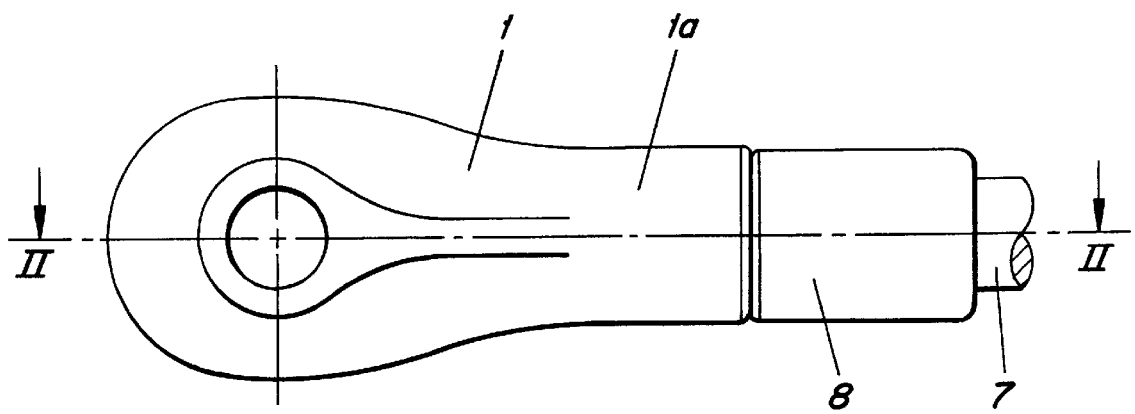
FIG. 1 shows a rod anchor for tension rods in a side view.
Figure 2:
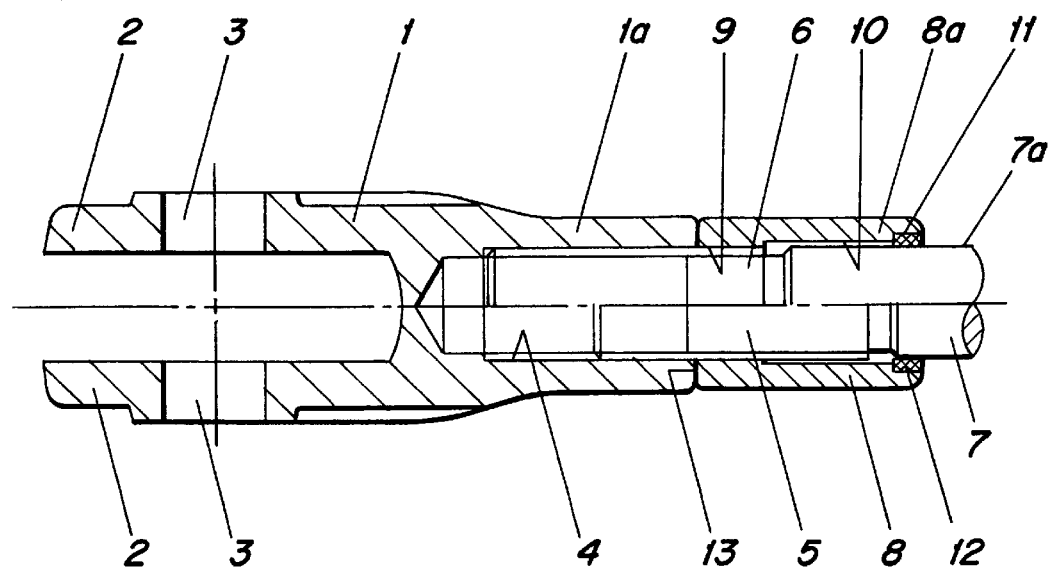
FIG. 2 shows a cross-sectional view along the line II—II in FIG. 1.

The rod anchor shown in FIG. 1 and FIG. 2 comprises an anchor head 1 that is designed in the form of a fork and which has two parallel eye bars 2 located at a distance apart from one another. Said eye bars 2 each have a bore hole 3, which is made for the insertion of a not-illustrated eye pin to make connection with an again not-illustrated eye rod. A shell-shaped section 1a of the anchor head 1 comprises a threaded bore hole 4, which is screwed onto an outer thread 5 disposed at the rod end 6 of a tension rod 7.

In the version shown in FIG. 2, the threaded bore hole 4 is designed as a pocket (blind) bore hole and is thereby closed off at the axially inner end. The tension rod end 6 with the outer thread 5 is attached to the main section of the tension rod 7, which has a smooth cylindrical outer surface 7a.

In front of section 1a of the anchor head 1 there is a sealing nut 8 located, which is designed as a lock nut according to the version shown in FIG. 1 and FIG. 2. The sealing nut 8 has an inner nut thread 9 in the end of the bore hole facing the anchor head 1 and said inner thread is screwed onto the outer thread 5 of the tension rod 7. A nut extension 8a joins the inner nut thread 9 in an axial direction whereby said nut extension 8a has a bore hole 10 in the illustrated example, which has a diameter that is greater than the diameter of the outer thread 5 of the tension rod 7.

As shown in FIG. 2, a sealing ring 12 having radially inner and outer flat surfaces is inserted in a boring indentation 11 that is located at the end of the nut extension 8a, which faces away from the inner nut thread 9. This elastic sealing ring 12 forms a seal around the smooth cylindrical surface 7a of the tension rod 7.

Between the axially facing end surfaces sides of the anchor head 1 and the lock nut 8, there is a layer 13 made of sealing varnish, for example rubberized varnish, which forms a tight seal under the effects of forced pressure. In this way, the area of the threaded connection between the tension rod 7 and the anchor head 2 has been sealed in all directions, so that penetration of moisture and development of corrosion is thereby prevented. Since the sealing ring 12 presses against the smooth outer surface 7a, the sealing effect remains the same independent from each selected screw depth of the tension rod 7.

The Version in FIG. 3 is different from the versions described previously in that the threaded bore hole 4' is not designed as a pocket bore hole but extends into the area between the eye bars 2. The threaded bore hole 4' is tightly closed with a sealing plate 14 made of synthetic material, which is located at the end of the thread.

A sealing ring 16 is located in the front ring recess 15 of the lock nut 8', which forms a seal against axially facing front side of the anchor head 1'. However, the ring recess 15 may instead be located in the front side of the anchor head 1' itself.

Similar to the version in FIG. 2, an elastic sealing ring is located near the outer end of tie nut extension 8a. In this case, we are talking about an O-ring 12' that is attached to a sealing nut 11' and which forms a seal against the smooth cylindrical outer surface 7a of the tension rod 7.

In the version in FIG. 4, the threaded bore hole 4" of the anchor head 1" is closed off at its inner end with a moldable elastic sealing plug 17, which is located in front of the tension rod end 6. A considerable difference of the version in FIG. 4, compared to previously described versions, is the fact that the sealing nut 8" is not designed as a lock nut but as an union nut, which is screwed to the outer thread 18 of the anchor head. Even there, the sealing nut 8" has a shell-shaped nut extension 8a" at the junction to the inner nut thread 9" whereby a rod seal 19 fits against said nut extension 8a". The rod seal is thereby an elastic compression seal, which fills the space between the nut extension 8a" and the tension rod 7. The threaded connection between the sealing nut 8" and the anchor head 1" is preferably designed as a sealing knuckle thread, so that here also—and as in the versions in FIG. 2 or FIG. 3—complete sealing of the threaded connection of the tension rod 7 against the anchor head 1" has been achieved.

What is claimed is:

1. A rod anchor adapted to be threadedly connected to a tension rod, comprising:

an anchor head having a threaded first bore hole formed therein, an axially inner end of the first bore hole being closed, and an axially outer end of the first bore hole being open; and a sealing nut adjoining the anchor head in sealing relationship therewith and forming a second bore hole axially aligned with the first bore hole, whereby a threaded end of a tension rod can be inserted through the second bore hole and into the first bore hole, the sealing nut including separate first and second elements, the first element including a helical thread for mounting the sealing nut, the second element formed of a sealing material adapted to form a seal between the sealing nut and the tension rod extending through the second bore hole.

2. The rod anchor according to claim 1 wherein the sealing nut is threadedly mounted on the anchor head.

3. The rod anchor according to claim 2 wherein the sealing nut constitutes a lock nut, and the sealing material is located in a non-threaded section of the second bore hole.

4. The rod anchor according to claim 3 wherein the second element constitutes an elastic sealing ring mounted in the lock nut.

5. The rod anchor according to claim 4 wherein the sealing ring has radially and outer flat sealing surfaces.

6. The rod anchor according to claim 2 wherein the anchor head includes an external thread, and the thread disposed on the first element comprising an internal thread attached to the external thread.

7. The rod anchor according to claim 6 wherein the internal and external threads together form a sealing knuckle thread structure.

8. The rod anchor according to claim 1 wherein the second element comprises an elastic compression seal that is axially compressed between the anchor head and the first element, whereby the compression seal also forms a seal between the anchor head and the sealing nut.

9. The rod anchor according to claim 1 further including additional sealing material compressed axially between the anchor head and the first element to form a seal therebetween.

10. The rod anchor according to claim 9 wherein the additional sealing material comprises a layer of sealing varnish located between axially facing surfaces of the anchor head and the first element, respectively.

11. The rod anchor according to claim 9 wherein the anchor head and the first element include respective axially facing surfaces opposing one another, the additional sealing material comprising an elastic sealing ring mounted in one of those axially facing surfaces.

12. The rod anchor according to claim 1 wherein the first bore hole comprises a blind bore hole.

13. The rod anchor according to claim 1 further including a sealing plate closing the axially inner end of the first bore hole.

14. The rod anchor according to claim 1 further including an elastic sealing plug closing the axially inner end of the first bore hole.

15. The rod anchor according to claim 1 wherein the thread of the sealing nut comprises an internal thread adapted to be connected to the tension rod.

16. A rod anchor adapted to be threadedly connected to a tension rod, comprising:

an anchor head having a threaded first bore hole formed therein, an axially inner end of the first bore hole being closed, and an axially outer end of the first bore hole being open; and a sealing member adjoining the anchor head in sealing relationship therewith and forming a second bore hole axially aligned with the first bore hole, whereby a threaded end of a tension rod can be inserted through the second bore hole and into the first bore hole, the sealing member including sealing material adapted to form a seal between the sealing member and the tension rod extending through the second bore hole, wherein the sealing member comprises a sealing nut threadedly mounted on the anchor head.

17. A rod anchor adapted to be threadedly connected to a tension rod, comprising:

an anchor head having a threaded first bore hole formed therein, an axially inner end of the first bore hole being closed, and an axially outer end of the first bore hole being open; and a sealing member adjoining the anchor head in sealing relationship therewith and forming a second bore hole axially aligned with the first bore hole, whereby a threaded end of a tension rod can be inserted through the second bore hole and into the first bore hole, the sealing member including sealing material adapted to form a seal between the sealing member and the tension rod extending through the second bore hole, wherein the sealing member has a thread adapted to be connected to the tension rod.

18. In combination, a tension rod and a rod anchor, the rod anchor comprising:

an anchor head having a threaded first bore hole formed therein, an axially inner end of the first bore hole being closed, and an axially outer end of the first bore hole being open, and a sealing member adjoining the anchor head in sealing relationship therewith and forming a second bore hole axially aligned with the first bore hole, whereby a threaded end of the tension rod extends through the second bore hole and into threaded engagement with the first bore hole, the sealing member including sealing material forming a seal between the sealing member and the tension rod.

19. The combination according to claim 18 wherein the sealing material comprises an elastic member carried by the sealing member and engaging an outer peripheral surface of the tension rod.

20. The combination according to claim 19 wherein the elastic member also forms a seal between the anchor head and the sealing member.

21. The combination according to claim 19 further including additional sealing material separate from the elastic member and forming a seal between the anchor head and the sealing member.

22. The combination according to claim 18 wherein the sealing member comprises a sealing nut threadedly mounted on the anchor head.

23. The combination according to claim 18 wherein the sealing member is threadedly mounted on the tension rod.

* * * * *